(12) United States Patent
Yuan

(10) Patent No.: US 8,567,806 B2
(45) Date of Patent: Oct. 29, 2013

(54) BICYCLE SADDLE AND A BICYCLE INCLUDING THE SAME

(71) Applicant: Chin-Chien Yuan, Taipei County (TW)

(72) Inventor: Chin-Chien Yuan, Taipei County (TW)

( * ) Notice: Subject to any disclaimer, the term of this patent is extended or adjusted under 35 U.S.C. 154(b) by 0 days.

(21) Appl. No.: 13/735,640

(22) Filed: Jan. 7, 2013

(65) Prior Publication Data

US 2013/0175783 A1 Jul. 11, 2013

(30) Foreign Application Priority Data

Jan. 9, 2012 (CN) .................. 2012 2 0006098 U
Apr. 18, 2012 (TW) .......................... 101207158 A

(51) Int. Cl.
*B62K 19/00* (2006.01)

(52) U.S. Cl.
USPC ....................................................... 280/281.1

(58) Field of Classification Search
USPC ........................................ 280/281.1; 297/202
See application file for complete search history.

(56) References Cited

U.S. PATENT DOCUMENTS

| 471,417 A * | 3/1892 | Bunker ...................... 297/195.1 |
| 2,690,211 A * | 9/1954 | Wentz ......................... 248/155.1 |
| 4,108,462 A * | 8/1978 | Martin ........................ 280/304.4 |
| 4,512,608 A * | 4/1985 | Erani ............................. 297/201 |
| 4,613,187 A * | 9/1986 | Gordon ...................... 297/452.1 |
| 4,950,004 A * | 8/1990 | Sunshine .................... 297/452.1 |
| 6,074,002 A * | 6/2000 | Hansen ......................... 297/201 |
| 6,378,938 B1 * | 4/2002 | Nelson .......................... 297/202 |
| 6,666,507 B1 * | 12/2003 | Ringgard .................... 297/195.1 |
| 6,705,674 B1 * | 3/2004 | McMahan et al. ......... 297/195.1 |
| 6,783,176 B2 * | 8/2004 | Ladson, III ................... 297/202 |
| 8,297,696 B2 * | 10/2012 | Chuang ......................... 297/199 |
| 2007/0108808 A1 * | 5/2007 | Chuang ...................... 297/195.1 |

* cited by examiner

*Primary Examiner* — Tashiana Adams
(74) *Attorney, Agent, or Firm* — Morris Manning & Martin LLP; Tim Tingkang Xia, Esq.

(57) ABSTRACT

The present invention provides a bicycle which comprises a bicycle frame, a pair of wheels, a gear assembly, and a bicycle saddle, the bicycle characterized in that: the bicycle saddle has a base and a main body, the main body being disposed on the base and extending to left and right sides along a longitudinal axis between front and rear ends of the bicycle frame. The rider feels comfortable when riding a bicycle of this invention because the rider's crotch area is not in contact with the saddle nor rubs against it. Moreover, a large area of the rider's buttocks can be in contact with the main body of the bicycle saddle, which makes the rider feel comfortable too.

12 Claims, 4 Drawing Sheets

BICYCLE SADDLE AND A BICYCLE INCLUDING THE SAME

CROSS-REFERENCE TO RELATED APPLICATION

This non-provisional application claims priority under 35 U.S.C. §119(a) on Patent Application No. 201220006098.8 filed in P.R. China on Jan. 9, 2012, and Patent Application No. 101207158 filed in Taiwan (R.O.C.) on Apr. 18, 2012, the entire contents of which are hereby incorporated by reference.

BACKGROUND OF THE INVENTION

1. Field of the Invention

The present invention relates to a bicycle, and more particularly, to a bicycle including a saddle which is arranged to extend to left and right sides along a longitudinal axis between front and rear ends of the bicycle's frame.

2. Description of the Prior Art

As bicycles are more lightweight, convenient and affordable, they have been commonly used as a means of transport for about two hundred years. Besides, in light of the global energy crisis and an increase in environmental awareness, more and more people are using bicycles as vehicles for transport, hoping that fewer emissions of carbon dioxide by cars and motorbikes help reduce air pollution and that energy consumption is reduced too, let alone cycling exercise has many health benefits.

Conventionally, a bicycle saddle is designed to include a main body having a flat surface, and wherein the front part of the main body extends forward and is generally long and narrow in shape. The back part of the saddle's main body extends to left and right sides of the bicycle and covers a larger area. The saddle is secured to the seat post of the bicycle for riding. However, the long, narrow part of the saddle is placed under the rider's natal cleft and crotch area, which causes pressure and pain to the tip of the hip bone due to the contact between the bone tip and the saddle. Moreover, the rubbing between the crotch area and the saddle may cause abrasions to the crotch after a long time riding.

In view of the above drawbacks associated with conventional bicycle saddles, the present invention provides a new type of bicycle saddle and a bicycle including that saddle. The bicycle saddle according to this invention is simple in structure, easy to assemble, and more ergonomically fit to the rider, so that the rider can enjoy an easier and more comfortable riding.

SUMMARY OF THE INVENTION

The present invention provides a bicycle and a bicycle saddle which are designed to address the problems as described above with conventional bicycles.

An object of this invention is to provide a bicycle with a saddle which is positioned to extend transversely across the longitudinal direction of the bicycle, such that a large area of the rider's buttocks can be in contact with the saddle to make the rider feel comfortable.

Another object of this invention is to provide a bicycle saddle which has no structure in contact with the rider's natal cleft or crotch area. With this design, no resistance nor rubbing occurs between the rider and the structure of the bicycle saddle, and thus, the rider will not suffer from pain or abrasions while cycling.

Yet another object of this invention is to provide a bicycle saddle which is simple in structure and also more lightweight.

To achieve the above objects, a bicycle is provided which comprises a bicycle frame, a pair of wheels, a gear assembly, and a bicycle saddle, the bicycle characterized in that: the bicycle saddle has a base and a main body, the main body being disposed on the base and extending to left and right sides along a longitudinal axis between front and rear ends of the bicycle frame.

To achieve the above objects, a bicycle saddle is provided which comprises: a base and a main body, the main body being disposed on the base and extending to left and right sides along a longitudinal axis between front and rear ends of a bicycle frame.

Preferably, the base of the saddle comprises a base body and a base support extending from two sides of the base body, the base support having a first fastening portion at an end, and wherein the base of the saddle is also provided with a base cap to cover the base body.

Preferably, the base body comprises a supporting portion, a riding portion, and a pair of side caps, each of the supporting portion and the riding portion being a hollow cylinder having a second fastening portion which corresponds to the first fastening portion of the base support, the supporting portion being disposed within the riding portion, and the side caps covering two ends of the supporting portion.

Preferably, the end of the base support is curve-shaped and has a curvature designed in accordance with a curvature of an outer surface of the riding portion.

Preferably, the base of the saddle comprises a base body and a base support extending from two sides of the base body, the base support having a hook-like structure.

Preferably, the main body comprises a supporting portion and a riding portion, the main body being disposed on the hook-like structure of the base support, and each of the supporting portion and the riding portion having an arc-like shape.

Preferably, the main body comprises a supporting portion and a riding portion, the main body being disposed on the hook-like structure of the base support, and each of the supporting portion and the riding portion having a cuboid-like shape.

Preferably, the main body comprises a supporting portion and a riding portion, the main body being disposed on the hook-like structure of the base support, and each of the supporting portion and the riding portion being curve-shaped with a concave curve extending upward from the hook-like structure of the base support.

The following detailed description of embodiments, appended drawings and claims will enable the reader to better understand other objects, features and advantages of the present invention.

DETAILED DESCRIPTION OF THE PREFERRED EMBODIMENTS

While this invention will be fully described with preferred embodiments and the appended drawings, it is to be understood beforehand that those skilled in the art can make modification to the invention described herein and attain the same effect. Therefore, it is to be understood that the description hereinafter is a general representation to those skilled in the art and is not intended to limit the scope of the present creation.

Figure 1:
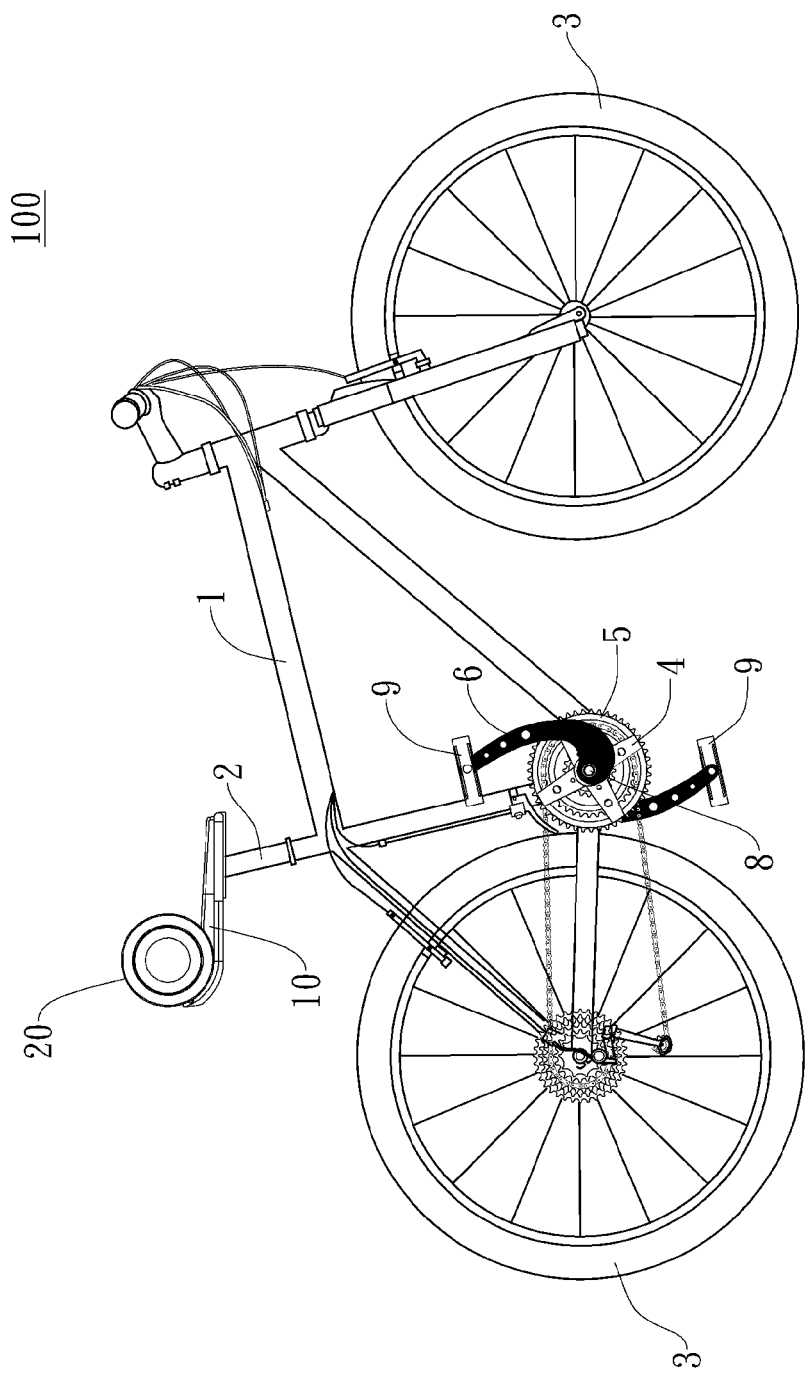
FIG. 1 is a side view of a bicycle according to a first embodiment of the present invention.

FIG. 1 is a side view of a bicycle according to a first embodiment of the present invention. A bicycle 100 of the present invention comprises: a bicycle frame 1 having a seat post 2; a pair of wheels 3 pivotally attached to lower front and rear ends of the bicycle frame 1; a gear assembly 4 pivotally attached to the central lower end of the bicycle frame 1, the gear assembly 4 comprising a chaining 5 and a pair of cranks 6; and a bicycle saddle 7 installed on the seat post 2 of the bicycle frame 1.

As shown in this embodiment, each of the cranks 6 has one end pivotally attached to an axle 8 of the gear assembly 4 and the other end pivotally attached to a pedal 9.

Figure 2:
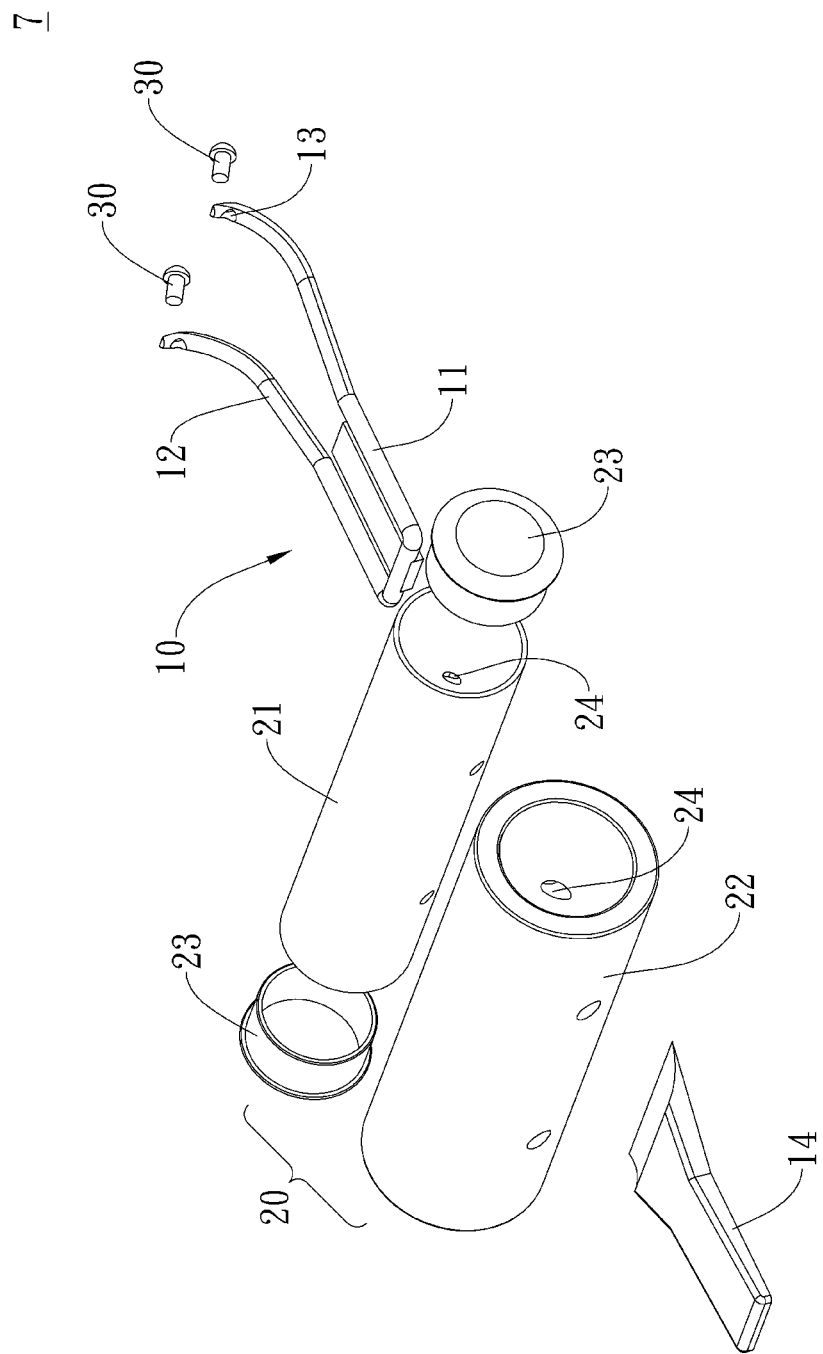
FIG. 2 is an exploded view of a bicycle saddle according to the first embodiment of the present invention.

Please also refer to FIG. 2, which is an exploded view of the bicycle saddle according to the first embodiment of the present invention. A bicycle saddle 7 of the present invention comprises: a base 10 and a main body 20. The main body 20 is disposed on the base 10 and extends to left and right sides along a longitudinal axis between front and rear ends of the bicycle frame 1.

As shown in FIG. 2, the base 10 comprises a base body 11 and a base support 12 extending from two sides of the base body 11. The base support 12 has a first fastening portion 13 at an end. The base 10 is also provided with a base cap 14 to cover the base body 11. The base body 20 comprises a supporting portion 21, a riding portion 22, and a pair of side caps 23. Each of the supporting portion 21 and the riding portion 22 is a hollow cylinder having a second fastening portion 24 which corresponds to the first fastening portion 13 of the base support 12. The supporting portion 21 is disposed within the riding portion 22, and the side caps 23 cover two ends of the supporting portion 21.

In this embodiment, the end of the base support 12 is curve-shaped and has a curvature designed in accordance with that of the outer surface of the riding portion 22. Therefore, if the outer surface of the riding portion 22 of the saddle 7 has a different design, the design for the end of the base support 12 shall change accordingly. In this embodiment, the riding portion 22 is formed by soft materials suitable for making a comfortable seat.

Figure 3:
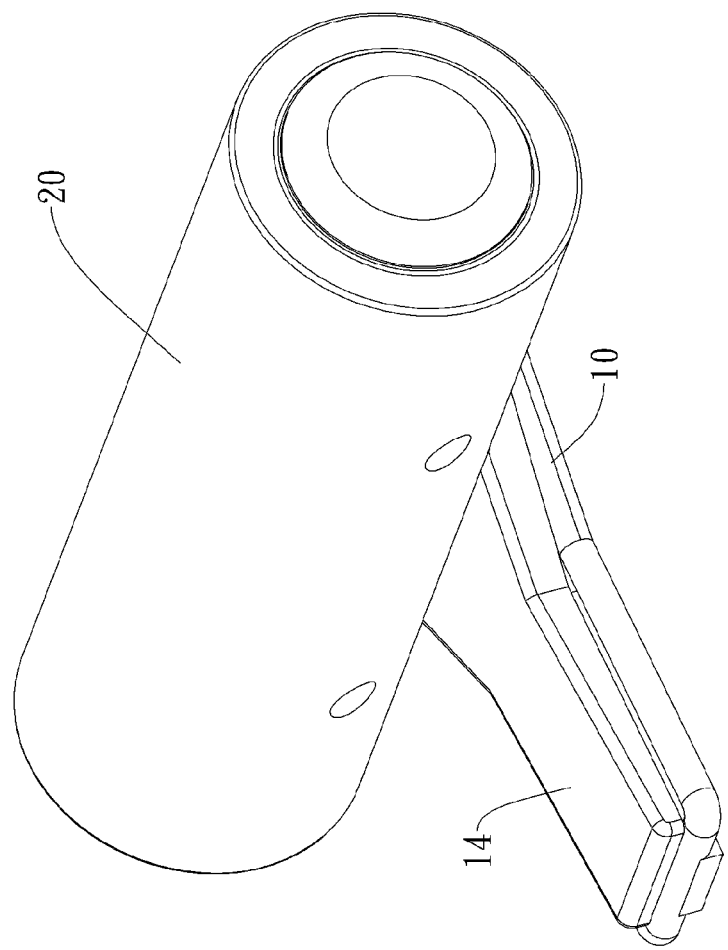
FIG. 3 is a perspective view of an assembled bicycle saddle according to the first embodiment of the present invention.

FIG. 3 is a perspective view of an assembled bicycle saddle according to the first embodiment of the present invention. The assembly of the bicycle saddle 7 begins with disposing the supporting portion 21 within the cylindrical space of the riding portion 22, such that the supporting portion 21 is completely enclosed by the riding portion 22. Then each of the second fastening portion 24 of the supporting portion 21 is aligned with the corresponding second fastening portion 24 of the riding portion 22. Thereafter, the pair of side caps 23 are disposed to cover the two ends of the supporting portion 21, and the main body 20 is thus formed. Next, the base cap 14 is disposed on the base body 11 to cover it, and the main body 20 is disposed on the base support 12. Next, the second fastening portions 24 of both the supporting portion 21 and the riding portion 22 are aligned with the first fastening portions 13 at the end of the base support 12. Thereafter, a fastener 30 is used to fasten each first fastening portion 13 and second fastening portion 24, such that the main body 20 is secured on the base 10 and the assembly of the bicycle saddle 7 is completed.

In this embodiment, the first fastening portion 13 and the second fastening portion 24 are holes, and the fastener 30 is a bolt.

The base 10 of this embodiment is disposed on the seat post 2 of the bicycle frame 1, and the main body 20 is disposed on the base 10. Also, the main body 20 extends to left and right sides along the longitudinal axis between front and rear ends of the bicycle frame, and is thus positioned transversely across the base 10. As the main body 20 is disposed on the base support 12 of the base 10, and the whole structure of the main body 20 does not cover the longitudinal length of the base body 11, the bicycle saddle 7 of the present invention roughly forms a T-shape. Therefore, when the rider is riding the bicycle 100 of this invention, s/he will feel comfortable because the crotch area is not in contact with the saddle nor rubs against it. Moreover, a large area of the rider's buttocks can be in contact with the main body 20, which makes the rider feel comfortable too.

Figure 4:
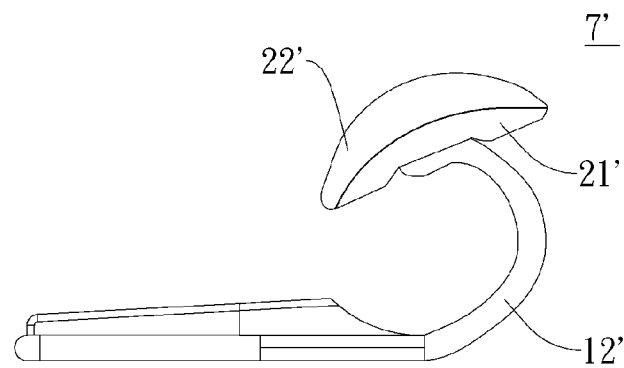
FIG. 4 is a side view of a bicycle saddle according to a second embodiment of the present invention.

FIG. 4 is a side view of a bicycle saddle according to a second embodiment of the present invention. The bicycle saddle in this embodiment has a structure substantially identical to that in the first embodiment (as shown in FIG. 2 and FIG. 3), and is only different in that the base support 12' in this embodiment has a hook-like structure. The main body 20' is disposed on the hook-like structure, and each of the supporting portion 21' and the riding portion 22' of the main body 20' has an arc-like shape.

Figure 5:
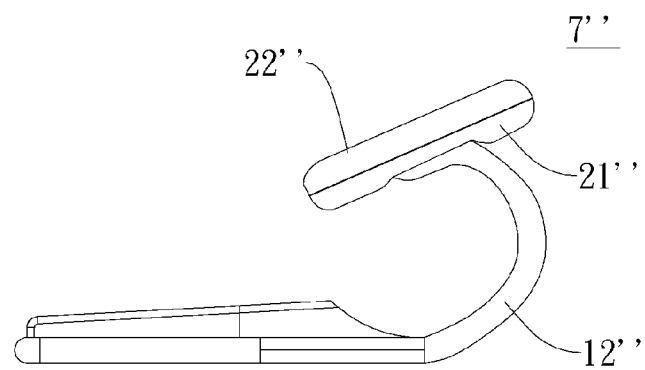
FIG. 5 is a side view of a bicycle saddle according to a third embodiment of the present invention.

FIG. 5 is a side view of a bicycle saddle according to a third embodiment of the present invention. The bicycle saddle in this embodiment has a structure substantially identical to that in the second embodiment (as shown in FIG. 4); the base support 12" in this embodiment also has a hook-like structure. The main body 20" is disposed on the hook-like structure, but each of the supporting portion 21" and the riding portion 22" of the main body 20" has a cuboid-like shape.

Figure 6:
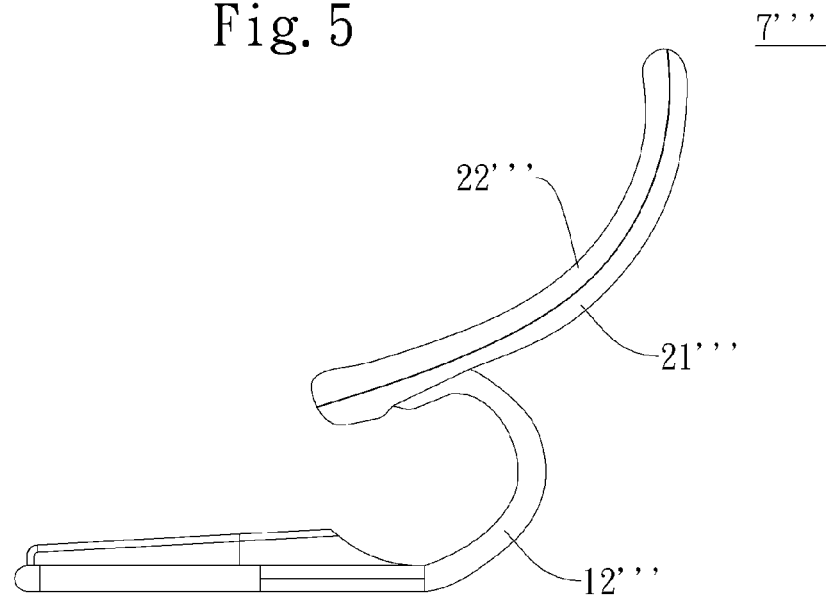
FIG. 6 is a side view of a bicycle saddle according to a fourth embodiment of the present invention.

FIG. 6 is a side view of a bicycle saddle according to a fourth embodiment of the present invention. The bicycle saddle in this embodiment has a structure substantially identical to that in the second embodiment (as shown in FIG. 4); the base support 12''' in this embodiment also has a hook-like structure. The main body 20''' is disposed on the hook-like structure, but each of the supporting portion 21''' and the riding portion 22''' of the main body 20''' is curve-shaped with a concave curve extending upward from the hook-like structure of the base support 12'''.

The bicycle saddle of this invention is arranged to extend transversely across the longitudinal direction of the bicycle; there is thus no structure in contact with the rider's natal cleft or crotch area. With this design, no resistance nor rubbing occurs between the rider and the structure of the bicycle saddle, and thus, the rider will not suffer from pain or abrasions while cycling. Moreover, the more ergonomically designed saddle and bicycle of this invention allow the rider to sit more comfortably while cycling, and the pressure to the rider's buttocks is relieved. Moreover, the bicycle saddle of this invention is placed under the rider's buttocks but is not in contact with the tip of the hip bone; thus, the pain caused by the contact with the hip bone tip is avoided. Since there is no structure at the front tip of the bicycle saddle that will rub against or press the rider's genitals, the rider feels more comfortable in a long-distance riding or during regular exercise, and the saddle also allows the rider's legs to apply force more easily. Moreover, since the rider's buttocks are positioned parallel to the bicycle saddle and supported by it when cycling, the buttocks are not prone to slide backward, thus helping the rider's legs to apply force and pedal more easily. Since the saddle is positioned to extend transversely across the longitudinal direction of the bicycle, a large area of the rider's buttocks can be in contact with the saddle and the rider therefore feels comfortable. Also, the bicycle saddle of this invention is simple rather than complicated in structure, and is thus more lightweight.

The various embodiments described herein and the accompanied drawings aim to give readers a general understanding of the structure of the present invention. They are not intended to give a full description of any device that uses the structure or methods described herein, or a full description of all the elements or features included in the system. By referring to the disclosure contained herein, those skilled in the art will understand that many other embodiments may derive from the present invention, and that other structural or logical replacements or changes to the present invention may be applied without departing from the spirit and scope of this invention. In addition, it will be understood that the drawings are merely schematic representations of the invention and not illustrated according to actual scale, and some of the components may have been magnified or simplified for purposes of pictorial clarity. The embodiments depicted above and the appended drawings are exemplary and are not intended to limit the scope of the present invention. The scope thereof is defined by the appended claims.

What is claimed is:

1. A bicycle comprising a bicycle frame, a pair of wheels, a gear assembly, and a bicycle saddle, characterized in that: the bicycle saddle has a base and a main body, the main body being disposed on the base and extending to left and right sides along a longitudinal axis between front and rear ends of the bicycle frame, wherein
    the base comprises a base body and a base support extending from two sides of the base body, the base support having a first fastening portion at an end, and the base is also provided with a base cap to cover the base body; and
    the main body comprises a supporting portion, a riding portion, and a pair of side caps, each of the supporting portion and the riding portion being a hollow cylinder having a second fastening portion which corresponds to the first fastening portion of the base support, the supporting portion being disposed within the riding portion, the side caps covering two ends of the supporting portion.

2. The bicycle of claim 1, wherein the end of the base support is curve-shaped and has a curvature designed in accordance with a curvature of an outer surface of the riding portion.

3. A bicycle comprising a bicycle frame, a pair of wheels, a gear assembly, and a bicycle saddle, characterized in that the bicycle saddle has a base and a main body, the main body being disposed on the base and extending to left and right sides along a longitudinal axis between front and rear ends of the bicycle frame, wherein
    the base comprises a base body and a base support extending from two sides of the base body, the base support having a hook-like structure; and
    the main body as a whole does not cover a longitudinal length of the base body.

4. The bicycle of claim 3, wherein the main body comprises a supporting portion and a riding portion, the main body being disposed on the hook-like structure of the base support, and each of the supporting portion and the riding portion having an arc-like shape.

5. The bicycle of claim 3, wherein the main body comprises a supporting portion and a riding portion, the main body being disposed on the hook-like structure of the base support, and each of the supporting portion and the riding portion having a cuboid-like shape.

6. The bicycle of claim 3, wherein the main body comprises a supporting portion and a riding portion, the main body being disposed on the hook-like structure of the base support, and each of the supporting portion and the riding portion being curve-shaped with a concave curve extending upward from the hook-like structure of the base support.

7. A bicycle saddle, comprising: a base and a main body, the main body being disposed on the base and extending to left and right sides along a longitudinal axis between front and rear ends of a bicycle frame, wherein
    the base comprises a base body and a base support extending from two sides of the base body, the base support having a first fastening portion at an end, and the base is also provided with a base cap to cover the base body; and
    the main body comprises a supporting portion, a riding portion, and a pair of side caps, each of the supporting portion and the riding portion being a hollow cylinder having a second fastening portion which corresponds to the first fastening portion of the base support, the supporting portion being disposed within the riding portion, the side caps covering two ends of the supporting portion.

8. The bicycle saddle of claim 7, wherein the end of the base support is curve-shaped and has a curvature designed in accordance with a curvature of an outer surface of the riding portion.

9. A bicycle saddle comprising a base and a main body, the main body being disposed on the base and extending to left and right sides along a longitudinal axis between front and rear ends of a bicycle frame, wherein
    the base comprises a base body and a base support extending from two sides of the base body, the base support having a hook-like structure; and
    the main body as a whole does not cover a longitudinal length of the base body.

10. The bicycle saddle of claim 9, wherein the main body comprises a supporting portion and a riding portion, the main body being disposed on the hook-like structure of the base support, and each of the supporting portion and the riding portion having an arc-like shape.

11. The bicycle saddle of claim 9, wherein the main body comprises a supporting portion and a riding portion, the main body being disposed on the hook-like structure of the base support, and each of the supporting portion and the riding portion having a cuboid-like shape.

12. The bicycle saddle of claim 9, wherein the main body comprises a supporting portion and a riding portion, the main body being disposed on the hook-like structure of the base support, and each of the supporting portion and the riding portion being curve-shaped with a concave curve extending upward from the hook-like structure of the base support.

* * * * *